(12) United States Patent
Mathis et al.

(10) Patent No.: US 7,464,621 B2
(45) Date of Patent: Dec. 16, 2008

(54) LONGITUDINALLY DISPLACED SHIFTER

(75) Inventors: William Mathis, Margate, FL (US); Christopher Lyew, Boynton Beach, FL (US)

(73) Assignee: Steeda Autosports, Inc., Pompano Beach, FL (US)

( * ) Notice: Subject to any disclaimer, the term of this patent is extended or adjusted under 35 U.S.C. 154(b) by 713 days.

(21) Appl. No.: 10/985,218

(22) Filed: Nov. 9, 2004

(65) Prior Publication Data

US 2006/0096401 A1  May 11, 2006

(51) Int. Cl.
*B60K 20/00* (2006.01)
(52) U.S. Cl. .................. 74/473.3; 74/473.12
(58) Field of Classification Search ............. 74/473.12, 74/473.1, 473.15, 473.3
See application file for complete search history.

(56) References Cited

U.S. PATENT DOCUMENTS

| | | | |
|---|---|---|---|
| 1,313,362 A * | 8/1919 | Wiegand ................ 74/473.12 |
| 3,049,934 A * | 8/1962 | Butler et al. ............ 74/335 |
| 3,417,634 A * | 12/1968 | Dangauthier ............ 74/473.34 |
| 3,955,437 A | 5/1976 | Heintz |
| 3,974,711 A | 8/1976 | Hurst, Jr. et al. |
| 4,515,032 A | 5/1985 | Olmsted |
| 4,532,823 A | 8/1985 | Razzacki |
| 4,541,062 A * | 9/1985 | Kada et al. .................. 700/247 |
| D281,409 S | 11/1985 | Cambria |
| 4,581,951 A | 4/1986 | Watson |
| 4,620,453 A | 11/1986 | Kumazawa |
| 4,872,619 A * | 10/1989 | Vaniglia .................. 242/437.3 |
| 5,289,734 A | 3/1994 | Parsons |
| 5,357,823 A | 10/1994 | Parsons |
| 5,433,125 A * | 7/1995 | Muller .................. 74/473.11 |
| 5,592,856 A | 1/1997 | Parsons |
| 5,914,002 A * | 6/1999 | Cahuzac .................. 156/92 |
| 6,016,717 A * | 1/2000 | Wheeler .................. 74/473.12 |
| 6,295,884 B1 | 10/2001 | Miyake et al. |
| 6,349,609 B1 | 2/2002 | Potter |
| 6,393,932 B1 | 5/2002 | Seki et al. |
| 6,415,677 B1 | 7/2002 | Skogward |
| 6,539,822 B1 | 4/2003 | Wilson |
| 6,569,058 B2 | 5/2003 | Presley |
| 6,612,194 B2 | 9/2003 | DeJonge |
| 6,622,583 B2 | 9/2003 | Wang |
| 6,637,281 B2 | 10/2003 | Yamamoto |
| 6,695,745 B1 | 2/2004 | Bjorkgard |
| 6,695,747 B2 | 2/2004 | Zimmermann et al. |
| 6,705,175 B1 | 3/2004 | Klatt |
| 6,718,842 B1 | 4/2004 | Bofias |
| 6,722,218 B1 | 4/2004 | Fischer et al. |
| 6,722,219 B2 | 4/2004 | Berger et al. |
| 6,738,701 B2 | 5/2004 | Wilson |
| 6,739,211 B2 | 5/2004 | Yamamoto et al. |
| 6,761,081 B2 | 7/2004 | Kliemannel |
| 6,766,706 B2 | 7/2004 | Easton et al. |
| 6,792,821 B1 | 9/2004 | Yamamoto |

(Continued)

Primary Examiner—David M Fenstermacher
(74) Attorney, Agent, or Firm—McHale & Slavin, P.A.

(57) ABSTRACT

A shifter apparatus for a manual transmission constructed and arranged for variable longitudinal displacement along the longitudinal centerline of the vehicle. The instant invention provides a shifter body assembly that is flexibly coupled at a first end to the vehicle body and flexibly coupled at a second end to a portion of the transmission housing via a structural connecting link. The connecting link may include various fixed or adjustable lengths to allow the shifter displacement.

20 Claims, 6 Drawing Sheets

U.S. PATENT DOCUMENTS

| | | | |
|---|---|---|---|
| 6,994,324 B2 * | 2/2006 | Harvey et al. | 254/388 |
| 7,194,927 B2 * | 3/2007 | Kozu et al. | 74/473.12 |
| 7,243,567 B2 * | 7/2007 | Osamura et al. | 74/335 |

* cited by examiner

LONGITUDINALLY DISPLACED SHIFTER

FIELD OF THE INVENTION

The present invention relates to a gear shifter for controlling operation of a manual vehicle transmission, more particularly, the invention relates to a longitudinally displaced gear shifter having a structural connecting link to control shifter displacement with respect to the transmission.

BACKGROUND OF THE INVENTION

Transmission shifters are conventionally utilized to provide manual actuation for shifting a transmission between different gears to control the driving torque delivered from a vehicle engine to the wheels. Vehicles with multi-speed gear ratio transmissions frequently employ a gear selector system having a pivoting selector lever operatively connected directly, or via linkage, to the transmission and moved by a driver to select a desired operational mode of the transmission.

While numerous transmission shifting devices are currently available, the linkage utilized to translate gear selections from the driver to the transmission can be broken into two broad categories, either internal linkage or external linkage.

Internal linkage transmissions generally utilize a tower mount and a drop-in type shifter. The transmission housing includes an upward standing tower portion which may be integrally formed or removably mounted to the transmission housing. The drop-in shifter assembly includes a lower plate tranversly oriented with respect to the shifter lever that bolts directly to the top surface of the housing tower to become an integral part of the transmission housing. The shifter lever is pivotally mounted within the central portion of the lower plate with a portion of the lever extending upward above the plate and a portion of the lever extending downward below the plate. The portion of the shift lever extending downward cooperates with the internal transmission linkage and the portion of the lever extending upward is utilized by the driver to manipulate the internal linkage.

Currently, drop-in shifters are the most common type of shifting mechanism utilized in automobiles that include manual transmissions. Despite the relatively common use of drop-in shifters, they include several drawbacks that have not been adequately addressed by the prior art. One such drawback relates to shifter positioning. The fixed positioning associated with drop-in shifters often results in a shift handle position that is uncomfortable or awkward for the driver. The fixed handle position is difficult to modify without extensive modification of the vehicle or shifter assembly. Another drawback associated with drop-in type shifters relates to sealing the shifter mechanism to prevent the fluid within the transmission from loss or contamination. Drop-in shift levers must include pivot points to allow the driver to manipulate the shifter and thus the transmission. The pivot points must remain lubricated for proper operation, yet they are difficult to seal and often allow fluid loss or contamination. Contaminated or lost fluid causes premature failure of the transmission components.

External linkage transmissions generally include complex mounting methods that are adapted to secure the shifter directly to the side or top of the transmission case. Linkage or cables are utilized to connect the shifter to multiple external levers which extend through the transmission case for manipulating the internal components. The method of mounting external linkage shifters generally includes complex metal stampings and a plurality of spacers. The stampings and spacers are assembled and secured to the transmission case with fasteners, and linkage or cables are thereafter adapted to extend between the shifter and the transmission.

External linkage shifters also suffer from numerous drawbacks that have not been adequately addressed by the prior art. One such drawback relates to the method of attaching the shifter to the transmission. The stampings and spacer combinations are complex in nature, resulting in high production costs and difficult installation. Repositioning of the shifter requires custom adapter plates and linkage which further complicates the construction. In addition, the assemblies must be adapted to attach to multiple transmission configurations within multiple vehicle configurations. This often results in a shifter that functions inadequately or unreliably.

Another drawback associated with external linkage transmissions relates to utilization of cables to transfer motion from the shifter to the transmission. Cables are prone to breakage and transfer a poor tactile sensation to the driver. The poor tactile sensation makes it difficult for a driver to feel when the shift has been properly executed and may cause unsafe conditions.

Other methods of transferring motion from a shifter to a transmission include complex electronic controllers for the operation of solenoids, hydraulics or pneumatics. Solenoids, pneumatics and hydraulics do not transfer any tactile sensations to the driver and are generally unreliable due to their complexity.

Accordingly, what is lacking in the art is a longitudinally displaceable shifter for vehicles with manual transmissions. The shifter should achieve objectives such as providing: construction flexibility that allows variable placement along the longitudinal centerline of the vehicle for installation within various vehicle configurations, including retrofitting existing vehicles with minimal modification of the transmission or vehicle. The shifter should include construction that permits reduced shifter lever throw, rigid linkage connection to the transmission, and reliable performance. The shifter should facilitate shifter lever interchangeability to suit particular driver needs.

DESCRIPTION OF THE PRIOR ART

A number of prior art shifter mechanisms exist for use with manual transmissions. Some of the shifting mechanisms are utilized in conjunction with internal linkage transmissions while others are utilized with external linkage transmissions. Many of the devices include solenoids, pneumatics or hydraulics to assist in the shifting operation; however, none permit adjustable longitudinal displacement of the shifter to suit a particular driver or a particular driving style.

U.S. Pat. No. 4,581,951 teaches a transmission shifter for controlling a manual transmission. The shifter includes a pair of independent spring biasers mounted within a housing to bias an operating member of the shifter and respectively control lateral movement of the operating member in opposite lateral directions independently of each other. Each spring biaser preferably includes at least one helical spring for providing the biasing with the lateral bias of one spring biaser greater than that of the other.

U.S. Pat. No. 4,515,032 teaches a drop in type shifter for offsetting a shifter to the side of an internal linkage manual transmission. The shifter includes an elongated base, a shift stick mounted in the base for multi-axis movement and a depending gear actuating lever. An elongated rail is supported on the base by spaced bearings for rotational and lateral shifting movements. The elongated base is secured to the side of the transmission housing with a plurality of brace members and the depending gear actuating lever cooperates with the transmission in the same fashion as a drop-in shifter.

U.S. Pat. No. 6,722,219 teaches a motor vehicle transmission that is shiftable in a track pattern with a selector track and shift tracks. A shifter element moves along the tracks when the transmission is shifted from one gear ratio to another. The shifts are directed by a control device sending command signals to an actuator device which, in turn, applies an actuating force to the transmission. A main position-detecting device detects the position of the shifter element relative to the selector track and shift tracks, and a redundant position-detecting device performs an additional, redundant determination of the shifter-element position.

U.S. Pat. No. 6,718,842 teaches a shift lever unit for transforming the tilting movements of a shift lever into electrical control signals, in particular for controlling a gearbox. The unit includes a shift lever and a rotating element which is rotated by the tilting movements of the shift lever and a sensor for detecting the angular position of the rotating element and transforming it into electrical signals.

U.S. Pat. No. 6,349,609 teaches an apparatus and method for converting an internal-linkage type of a transfer case from single lever to dual lever control. The apparatus includes a sleeve that is adapted for placement into a housing of the transfer case. The first and the second control levers are each adapted to cooperate with a member in the transfer case sufficient for the first arm to select either a two or a four wheel drive mode and for the second arm to select either a high or a low gear range when the first and second arms are pivoted about an axis.

U.S. Pat. No. 6,569,058 teaches a linearly moveable gear selector system for controlling operation of a vehicle drivetrain component. The gear selector system is coupled to a transmission and/or transfer case unit and is configured to shift the drivetrain component into a desired mode of operation. The gear selector system includes a selector lever that is movable by an operator in a linear direction parallel to a lengthwise axis of the vehicle. The selector system includes a slidable guide shaft that produces a linear motion linked to the drivetrain component that is proportion in magnitude and direction as that of selector lever.

U.S. Pat. No. 6,792,821 teaches a shifting device for operating the shift lever of a transmission equipped with a synchronizing mechanism in the direction of shift, which comprises a shift actuator for operating the shift lever in the direction of shift, a shift stroke sensor for detecting the shift stroke position of said shift lever, and a control means for controlling the electric power fed to said shift actuator based on a signal from said shift stroke sensor. The control means controls the electric power fed to the shift actuator in response to the shift stroke position detected by the shift stroke sensor.

U.S. Pat. No. 6,761,081 teaches a shifting device for shifting between different operating states of a motor vehicle transmission. A gearshift lever is mounted movably in a bracket for movement along two axis. A signal transmitter is provided for sending a transmitter signal, and three sensors are arranged at spaced locations from the signal transmitter and in the form of a triangle for detecting the transmitter signal. The sensors and the signal transmitter can be moved in relation to one another by the gearshift lever, and electric signals characterizing the particular shift position are sent by the sensors at least indirectly to an evaluating device by which the transmission can be put into different operating states as a function of the electric signals.

U.S. Pat. No. 6,739,211 teaches a shift actuator for a transmission, comprising an operation rod that engages with an operation member coupled to the shift lever of the transmission, a magnetic moving means arranged on the outer peripheral surface of said operation rod, a cylindrical fixed yoke surrounding said magnetic moving means, and a pair of coils arranged side by side in the axial direction inside said fixed yoke, wherein magnetic members are arranged on both sides of said pair of coils.

U.S. Pat. No. 6,722,218 teaches a motor vehicle transmission shiftable in a track pattern with a selector track and shift tracks. A shifter element moves along the tracks when the transmission is shifted from one gear ratio to another. The shifts are directed by a control device sending command signals to an actuator device which, in turn, applies an actuating force to the transmission.

U.S. Pat. No. 6,295,884 teaches an automatic speed-change control apparatus which automatically drives an actuator mechanism in a manual gear transmission. The apparatus includes an operating mechanism for controlling the operation of the actuators, a detecting mechanism for judging a speed-change timing and detecting the degree of accelerator depression, a calculating mechanism for calculating an operating factor corresponding to the degree of accelerator depression detected by the detecting mechanism to set a drive amount to the actuator so that the actuator operates by the calculated operate factor, and a command mechanism for supplying the drive amount to the actuator calculated by the calculating means and giving an operating command to the actuator.

U.S. Pat. No. 6,637,281 teaches a shift-assisting device for a transmission. An electric motor operates a shifting mechanism in the same direction as the direction in which a speed-change lever is shifted. The shifting mechanism is coupled to the speed-change lever to actuate a synchronizing mechanism of the transmission. The shift-assisting device for a transmission includes a shift stroke sensor for detecting a shift stroke position of the shifting mechanism and a controller for outputting a control signal corresponding to the shift stroke position to the electric motor based on a signal detected by the shift stroke sensor.

U.S. Pat. No. 6,695,745 teaches a gear shift device for a vehicle with a manually operated gearbox and a gear shift device for operating the gearbox. The gear shift device comprises a gear lever, a master cylinder and a slave cylinder, which are connected to the gearbox. A hydraulic line connects the cylinders with each other. The gear shift device also comprises a computer which can receive information concerning an initiated gear shift operation, establish the value of a torque which is exerted on a drive shaft between the vehicle's engine and the gearbox, and control the engine's power. In the hydraulic line there is mounted a shut-off valve and the computer is arranged to transmit impulses for controlling the shut-off valve based on the received information.

U.S. Pat. No. 6,705,175 teaches a device for controlling a gearshift which has a first pressure medium chamber and a second pressure medium chamber which are separated from each other by a piston. Pressure chambers are selectively connectable to a pressure medium source or to a pressure medium sink or can be closed off against both as a function of the output signals of an electrical control system. A pressure sensing device is installed between the pressure medium inputs of the two valve systems and the pressure medium outlet of the third valve system by which the pressure in each one of the pressure medium chambers of the gearshift can be measured or by which the pressure of the pressure medium source, i.e. the supply pressure, can be monitored. The electrical control system is designed in such manner that the actuation of at least one of the valve systems can be rendered dependent on at least the signals of the pressure sensing device, so that the gearshifting force and also the gearshifting speed of the gearshift can be controlled as a function of pressure.

As disclosed, the above devices fail to teach or suggest a manually operated shifting apparatus capable of variable displaced positioning along the longitudinal centerline of the vehicle. The prior art is also deficient in teaching a shifter apparatus which connects to the transmission housing as well as the vehicle body for increased rigidity and reliable performance. The prior art is also deficient in teaching a displaced shifter capable of high ratio/short throw shift lever motion for high performance and/or racing vehicle applications. The prior art is also deficient in teaching a displaced shifter apparatus which incorporates a removable/replaceable shift handle, wherein the shift handle may be customized for ergonomics and/or specific applications.

SUMMARY OF THE INVENTION

The present invention provides a shifter apparatus for a manual transmission. More specifically a shifter apparatus constructed and arranged for variable longitudinal displacement along the longitudinal centerline of the vehicle. Even more specifically, the instant invention provides a shifter body assembly that is flexibly coupled at a first end to the vehicle body and flexibly coupled at a second end to a portion of the transmission housing via a structural connecting link. In one embodiment the connecting link is constructed to be removable and replaceable, wherein the length of the connecting link may be manufactured to suit a particular application. In an alternative embodiment the connecting link may be constructed and arranged to be adjustable in length to suit various applications within a predetermined range. The shifter apparatus may be provided as an original equipment manufacturer (OEM) part or may be supplied as a kit that replaces the OEM supplied shifter.

The shifter lever includes an integrally formed spherical bearing pivotally mounted and self-centering within the shifter body. The shifter lever includes a portion extending upwardly to cooperate with an interchangeable shift handle and a portion extending downward to cooperate with a rigid linkage that extends to the transmission. The spherical bearing may be positioned along the shifter lever in various positions to cause various shifting ratios but preferably is positioned for short throw shifting. The shifter body assembly includes a stop plate that cooperates with the shifter lever to provide positive shifter lever stops during gear changes to reduce stress on transmission components.

The shifter body assembly and the connecting link are preferably constructed from a lightweight material such as aluminum to reduce the overall weight of the vehicle. In addition, the side surfaces of the connecting link are constructed to include contoured inwardly extending cavities which leave a central structural web. This construction provides superior bending and torsional rigidity while further reducing the weight of the shifter apparatus.

Accordingly, it is an objective of the present invention to provide a displaced shifter for vehicles with a manual transmission.

An additional objective of the present invention is to provide a displaced shifter for vehicles with a manual transmission which reduces shifter lever throw for faster transmission gear changes.

It is a further objective of the present invention to provide a displaced shifter for vehicles with a manual transmission that provides positive shifter lever stops to reduce stress on transmission components.

A still further objective of the present invention is to provide a displaced shifter for vehicles with a manual transmission that is constructed from billet aluminum to provide a lightweight assembly having additional bending and torsional rigidity when compared to the prior art.

Another objective of the present invention is to provide a displaced shifter for vehicles with a manual transmission which is simple to install and which is ideally suited for original equipment or may be supplied as a kit for aftermarket installations.

Yet another objective of the present invention is to provide a displaced shifter for vehicles with a manual transmission that is simple and reliable in operation.

Still another objective of this invention is to provide a displaced shifter for vehicles with a manual transmission that includes a removable and replaceable connector link for variable shifter displacement.

Still yet another objective of the instant invention is to provide a displaced shifter for vehicles with a manual transmission wherein each end of the shifter includes a thru-bore adapted to accept a rubber or urethane bushing for attachment to the transmission and the vehicle body, thereby increasing rigidity and reliability.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
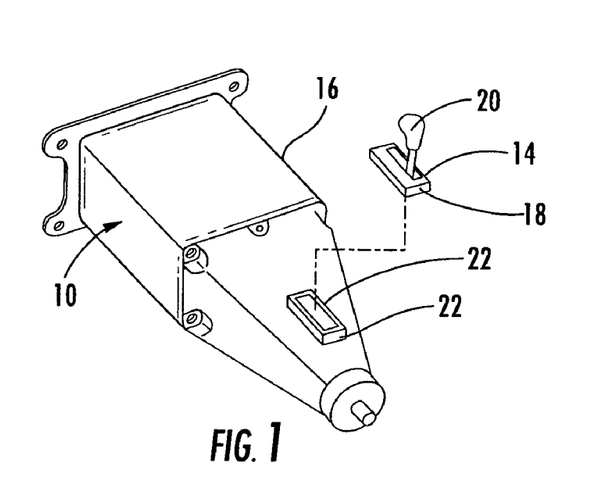
FIG. 1 is a perspective view illustrating an internal linkage transmission equipped with a tower mount and a drop-in shifter.

Referring to FIG. 1, a prior art internal linkage transmission 10 utilizing a shifter tower mount 12 and a drop-in type shifter 14 is shown. The transmission housing 16 includes an shifter tower 12 which may be integrally formed or removably mounted to the transmission housing 16. The drop-in shifter 14 includes a lower plate 18 transversely oriented with respect to the shifter lever 20. The shifter lever 20 is pivotally mounted within the central portion of the lower plate 18 with a portion of the lever extending upward above the plate and a portion of the lever extending downward below the plate. The lower plate 18 bolts directly to the top surface 22 of the shifter tower 12 to become an integral part of the transmission housing 16. The portion of the shift lever extending downward cooperates with the internal transmission linkage 24 and the portion of the lever extending upward is utilized by the driver to manipulate the internal linkage.

Figure 2:
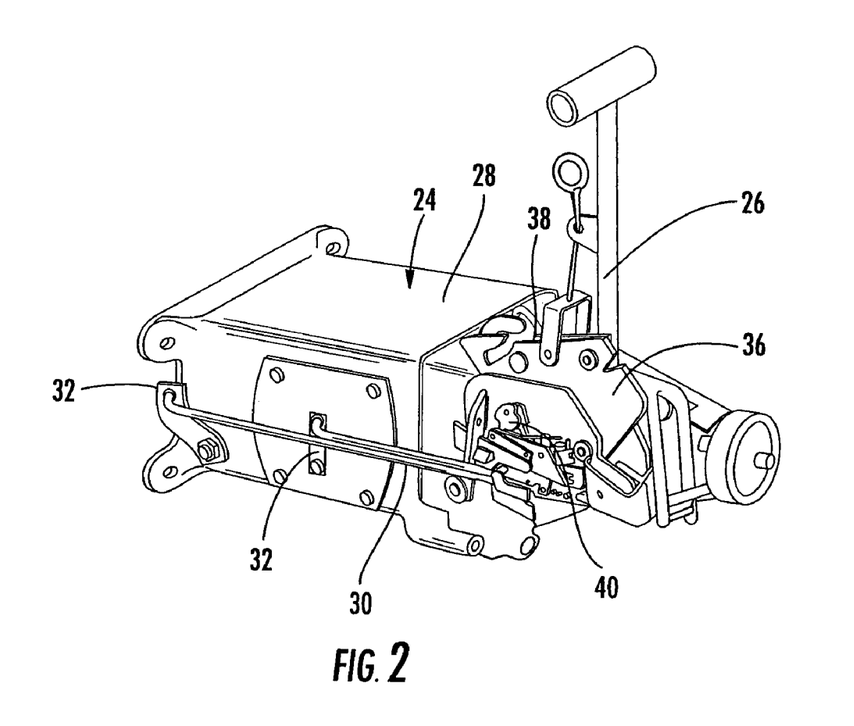
FIG. 2 is a perspective view illustrating an external linkage transmission equipped with a side mounted shifter.

Referring to FIG. 2, a prior art external linkage transmission 24 utilizing an external linkage shifter 26 mounted directly to the side of the transmission case 28 is illustrated. Complex metal stampings 36 and a plurality of spacers 38 are assembled and secured to the transmission case 28 with fasteners 40. Linkage 30 or cables are utilized to connect the shifter 26 to multiple external levers 32 which extend through the transmission case 28 for manipulating the internal components.

Figure 3:
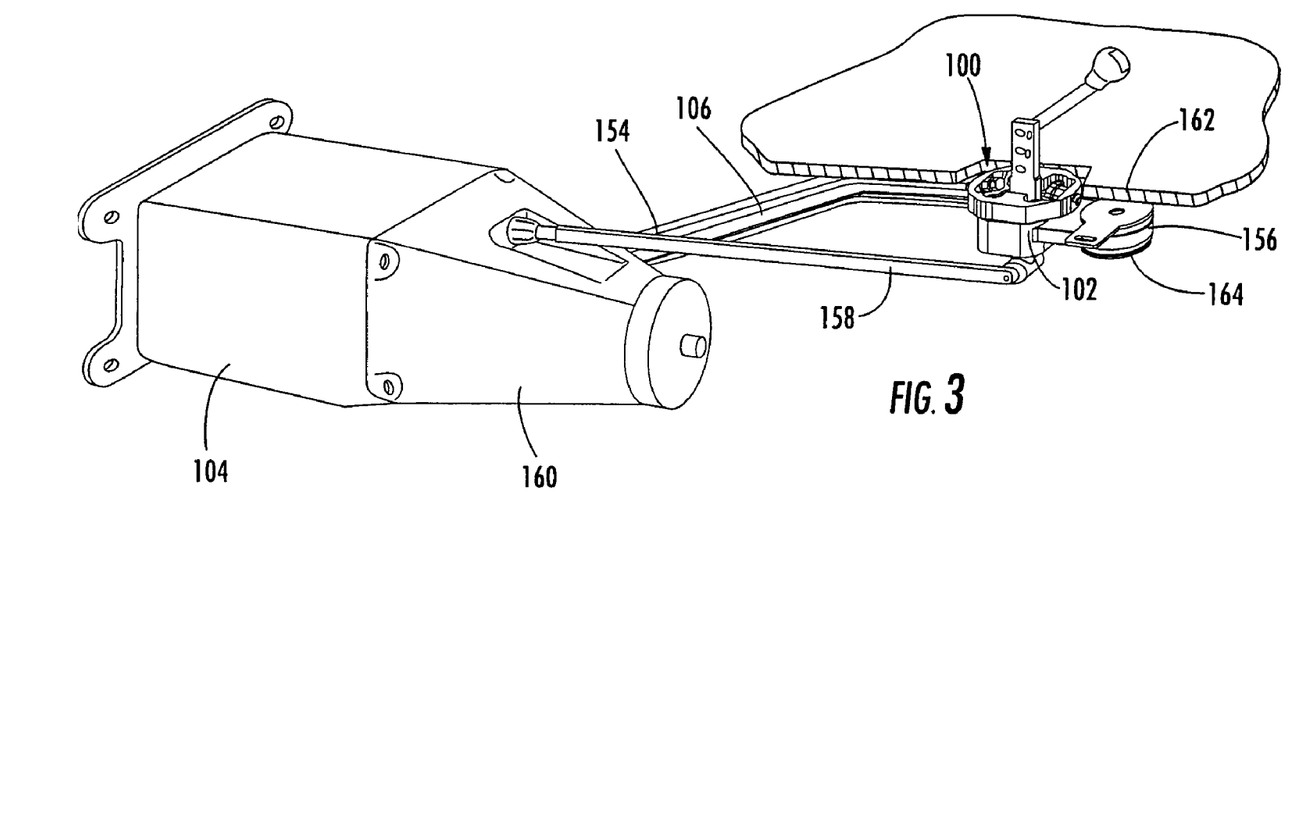
FIG. 3 is a perspective view illustrating the displaced shifter of the instant invention secured to a manual transmission.
Figure 4:
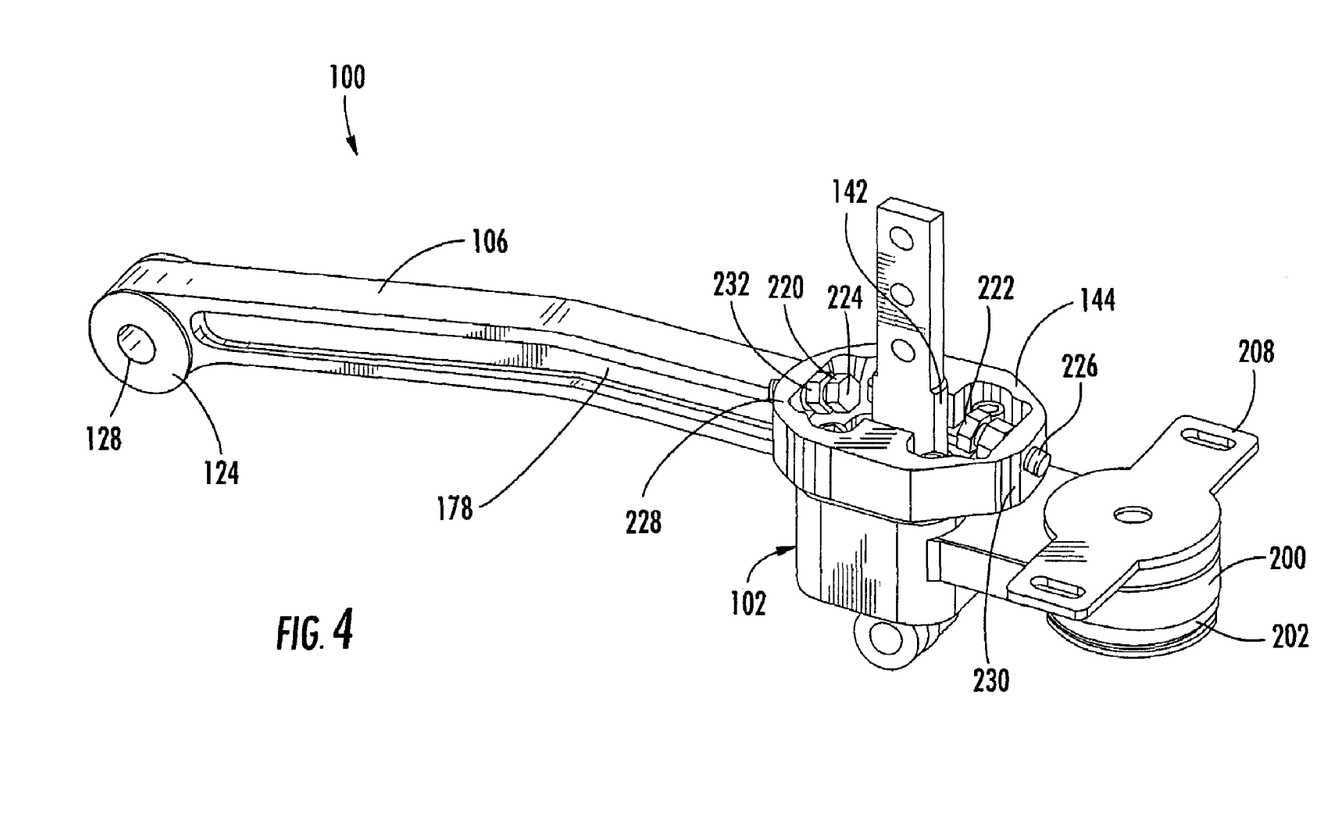
FIG. 4 is a perspective view illustrating the displaced shifter of the instant invention.
Figure 5:
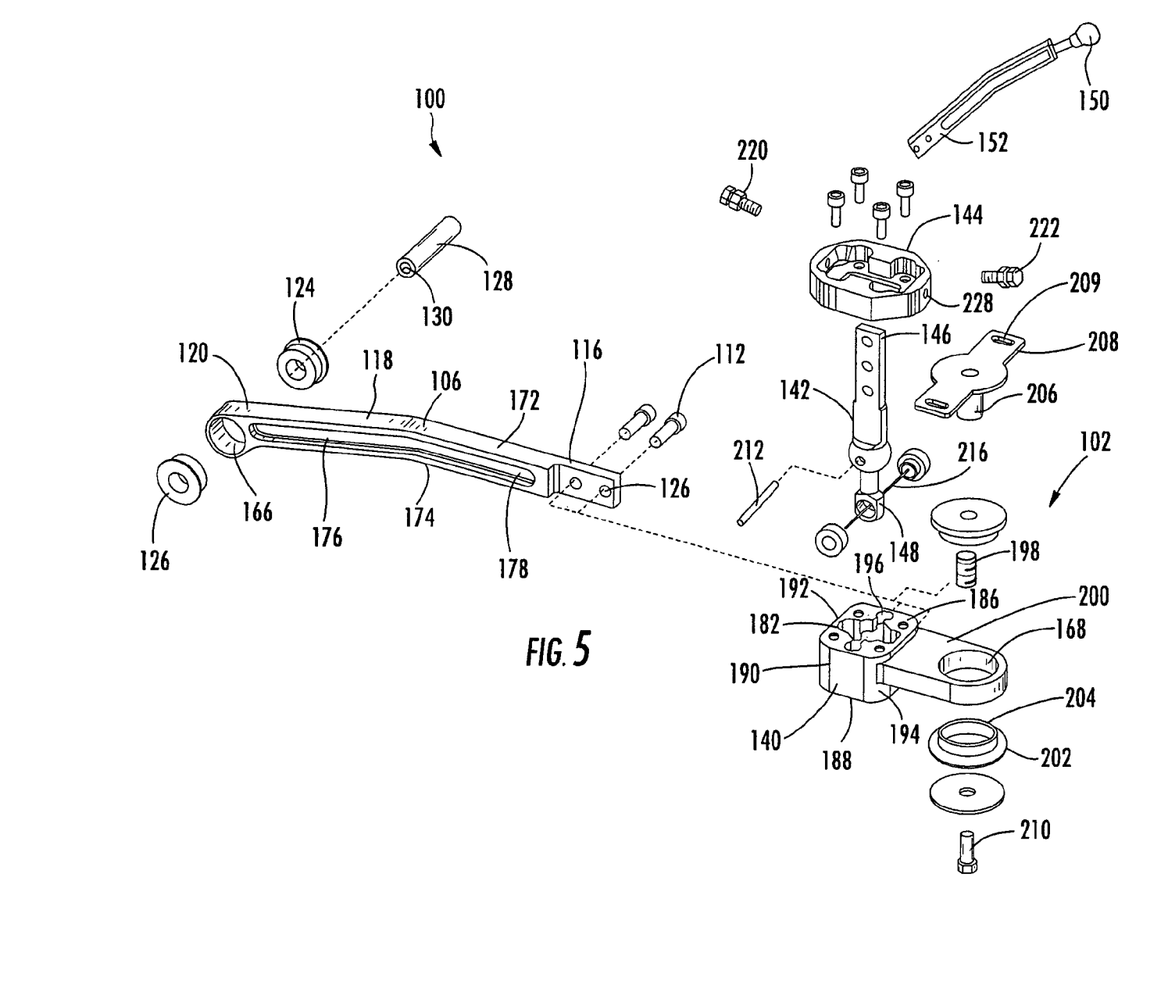
FIG. 5 is an exploded view of the instant displaced shifter.
Figure 6:
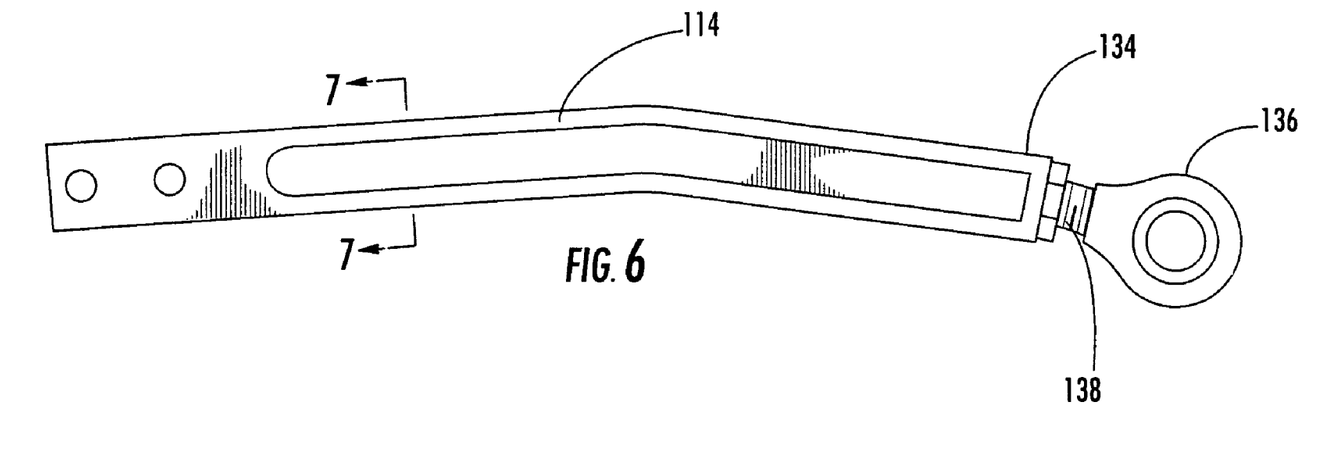
FIG. 6 is a partial view illustrating an alternative connecting link embodiment.

Referring to FIGS. 3 through 5 perspective and exploded views of the instant shifter assembly 100 are illustrated. The instant invention provides a shifter assembly 100 which may be supplied as original equipment or in the form of a kit which replaces the drop-in shifters 14 and external linkage shifters 26 of the prior art. The shifter assembly 100 comprises a body assembly 102 for operator controlled manipulation of a manual transmission 104 and a structural connecting link 106 for displacing the shifter body 102 with respect to the manual transmission 104. The connecting link 106 allows the shifter body 102 to be positioned along the longitudinal centerline of the vehicle for ergonomic advantage. The first and second ends 156, 154 of the shifter assembly 100 include thru-bores 166, 168 (FIG. 5) constructed to retain rubber or urethane bushings. The bushings control fore and aft shifter deflection and allow for angular articulation of the shifter assembly to minimize linkage 158 bind. Spherical bearings 136 (FIG. 6) may be substituted for the rubber or urethane bushings to further increase rigidity and stability of the assembly. Fasteners 164 extend through either the rubber/urethane bushings or the spherical bearings to allow the shifter assembly to be attached to the transmission housing 160 and the vehicle body 162.

Referring to FIG. 5, a connecting link 106 having a fixed length for providing predetermined shifter body 102 displacement is illustrated. In general, the connecting link 106 includes a first end 116, a center portion 118 and a second end 120. The first end 116 is constructed for removable and replaceable securement to the shifter body assembly 102 and the second end is constructed for attachment to the transmission housing 160 (FIG. 3). In the preferred embodiment first end 116 of the connector link 106 includes one or more apertures 126 constructed and arranged to receive one or more fasteners 112 for attaching the connector link 106 to the shifter body 102. It should also be noted that other fastening methods and devices well known in the art that are suitable for attaching structural components together may also be utilized. Such methods and devices may include, but should not be limited to, clamps, dovetails, collets and the like.

Figure 7:
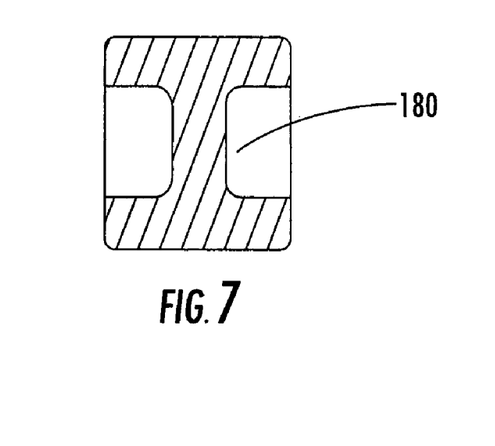
FIG. 7 is a section view of the connecting link taken along lines 1-1 of FIG. 6.

The center portion 118 of the connecting link includes an outer contoured perimeter defined by a top surface 172, a bottom surface 174 and two side surfaces 176. The contoured perimeter allows the connecting link to articulate while assembled in close proximity to drive-line, body and frame components without interference. The pair of side surfaces 176 are preferably constructed to include at least one contoured cavity 178. The contoured cavity 178 extends inwardly from each side surface 176 to leave a central web 180 (FIG. 7). In this manner weight of the shifter assembly 100 is reduced without sacrificing rigidity or strength of the connecting link 106.

The second end 120 of the connecting link 106 includes a first bore 166 extending substantially transverse with respect to the longitudinal centerline of center portion 118. The first bore 166 preferably includes a resilient bushing 124 to control fore and aft movement of the shifter assembly while permitting articulation of the shifter assembly with respect to the manual transmission. The resilient bushing 124 may be constructed of rubber, urethane or suitable combinations thereof. The durometer hardness of the resilient bushing may be increased for rigidity or decreased to allow increased articulation and vibration dampening. In a most preferred embodiment resilient member includes a central bore 126 constructed and arranged to receive a tubular metal sleeve 128. The tubular metal sleeve 128 includes a central bore 130 for receiving a fastener to secure the connecting link 106 to the transmission case 160.

Referring to FIG. 7, an alternative embodiment of the connecting link 114 having an adjustable length is illustrated. In this embodiment the second end 134 of the connecting link 106 includes an internal threaded bore for cooperation with a spherical bearing 136. The spherical bearing 136 includes an elongated threaded stem 138 for cooperation with the internal threaded bore. In this manner, the spherical bearing 136 is rotatable to adjust the length of the connecting link 114 for providing adjustable shifter body 102 displacement within a predetermined range with respect to the manual transmission 104. It should also be noted that other adjustable assemblies well known in the art, for allowing the length of a structural member to be adjusted, may be substituted for the spherical bearing and the threaded stem without departing from the scope of the invention. Such assemblies may include, but should not be limited to elongated slots, dovetails, telescoping members and the like.

Referring to FIGS. 4 through 8, the shifter body assembly is illustrated. The shifter body assembly 102 includes a shifter body 140, a shift lever 142 and a stop plate 144. In general, the shifter lever 142 is pivotally mounted and self-centering within the shifter body 140 and the stop plate functions to limit the pivotal travel of the shifter lever 142.

More specifically, the shifter body 140 includes an upper surface 186, a lower surface 188, two side surfaces 190, a front surface 192 and a rear surface 194. Centrally located within the shifter body is a contoured cavity 182. The contoured cavity cooperates with the spherical bearing 180 on the shift lever 142 for polyaxial shift lever movement. The shifter body also includes spring pockets 196 for retaining the shift lever centering spring members 198. The rear surface 194 of the shifter body includes an outwardly extending tab 200. The outwardly extending tab includes a bore 168 constructed to retain a resilient member 202. The resilient member 202 includes a central bore 204 for attaching the shifter body to the vehicle body. In one embodiment (Not shown) a fastener extends through the central bore 204 of the resilient member to cooperate with the vehicle body. In an alternative embodiment, a tubular metal sleeve 206 including one or more tabs 208 rigidly secured thereto is inserted into the central bore 204. A bolt 210 is used to secure the metal sleeve 206 within the resilient member(s) 202 and fasteners cooperate with tab apertures 209 to attach the shifter assembly 100 to the vehicle body 162 (FIG. 3). The resilient 202 member(s) may be constructed of rubber, urethane or suitable combinations thereof.

To provide the pivotal mounting required for operator manipulation of the shift lever, the shifter lever 142 includes an integrally formed spherical bearing 180 positioned between the first end 146 and said second end 148 portions of the shift lever. The spherical bearing 180 is constructed and arranged to cooperate with a contoured cavity 182 (FIG. 5) positioned within the shifter body 140. The spherical bearing preferrably includes a transverse bore 184 for accepting a pin member 212. The pin member includes sufficient length to extend outwardly from both sides of the spherical bearing 180 when assembled. The outwardly extending portions of the pin member each cooperate with the spring members 198 to center the shift lever 142.

The shift lever 142 includes a first end portion 146 extending upwardly above the shifter body for operator manipulation of the shifter lever and a second portion 148 extending downwardly below the shifter body 140 for connection to a shifter linkage 158 (FIG. 3). In the preferred embodiment the first end portion of the shift lever 146 is constructed and arranged to cooperate with a removable and replaceable shift handle 152. Alternatively, the first end portion of the shift lever may extend upwardly a suitable distance for attachment of a shift knob 150. In either embodiment the shift handle may include one or more offsets, bends or mounting positions for ergonomic placement of the shift knob 150. In this manner, shift handles 152 and knobs 150 of varying constructions may be secured to the shift lever 142 to suit a particular application.

Figure 8:
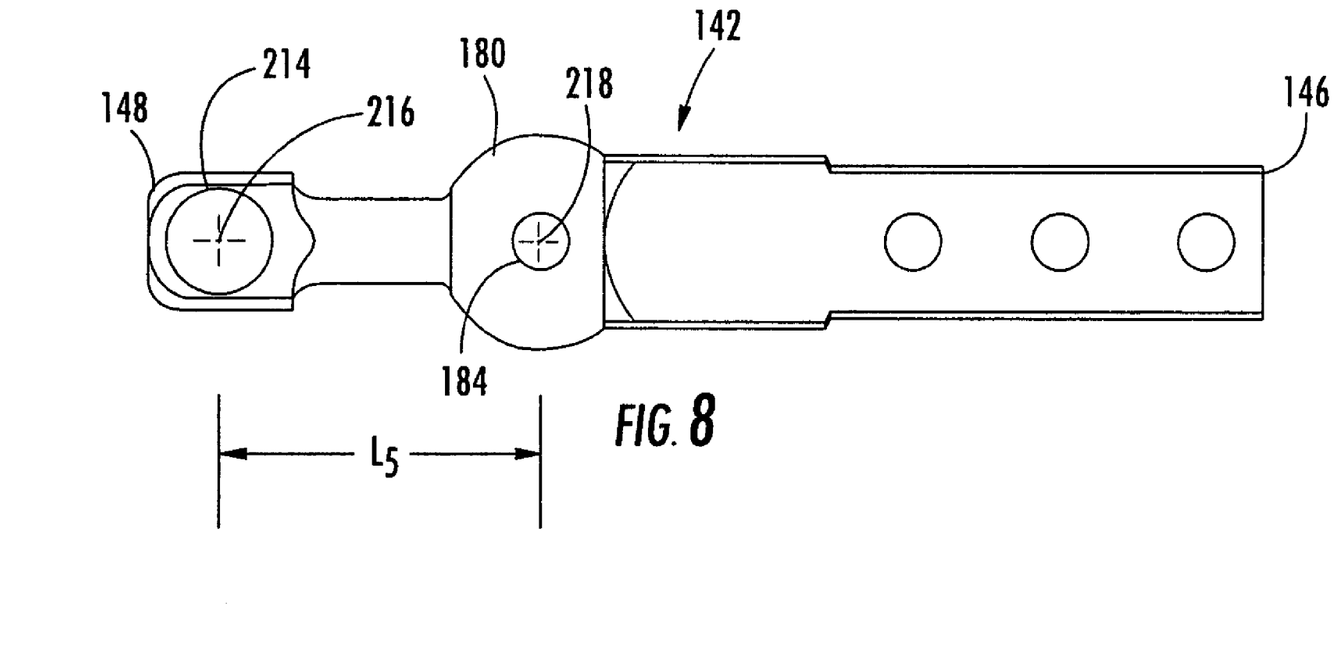
FIG. 8 is a plan view of the preferred shift lever embodiment.

The second end portion 148 of the shift lever includes a transverse bore 214 defining a centerline axis 216 for connection to the shifter linkage 158. The distance between the center of the spherical bearing 218 and the centerline axis 216 of the transverse bore 214 is defined herein as the linear spacing (LS)(FIG. 8). The linear spacing controls the throw or angle through which the shift lever 142 must travel to change gears within a given manual transmission. Increasing the linear spacing reduces shifter throw and decreasing linear spacing increases shifter throw. In the instant invention the preferred linear spacing ranges from about 1.8 inches to about 2.2 inches. In a most preferred embodiment the linear spacing is about 1.9 inches.

Referring to FIGS. 4 and 5, the stop plate 144 is illustrated. The stop plate 144 is constructed and arranged to attach to an upper surface 186 of the shifter body 140 and to cooperate with the shift lever 142 to limit pivotal travel of the shift lever.

The stop plate 144 includes a forward motion stop member 220 for controlling forward shift lever motion and a rearward motion stop member 222 for controlling rearward shift lever motion. In the preferred embodiment, the first and second stop members 220 and 222 include a top surface 224 and a threaded stem 226. The threaded stem 226 is constructed and arranged to cooperate with threaded apertures 228 located in the stop plate 144 at forward and rearward portions 228, 230 thereof. The stop members may then be adjusted and locked in place with lock nuts 232 so that the top surface 224 cooperates with the shift lever 142 to control the range of forward and rearward shift lever motion. In this manner, stress imposed upon internal transmission components during shift lever manipulations is dramatically reduced.

In a preferred and non-limiting embodiment, the connecting link 114 and the shifter body 102 are constructed of billet aluminum 6061 T6 billet aluminum. The connecting link and the shifter body may alternatively be made from other metals which may include, but should not be limited to steel, titanium or suitable combinations thereof.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. In a vehicle driveline, wherein said drive-line includes a manual transmission and an Original Equipment Manufacturer (OEM) shifter for operator controlled manipulation of said manual transmission, a shifter kit comprising:
a shifter assembly for replacing said OEM shifter, said shifter assembly including a shifter body assembly for operator controlled manipulation of said manual transmission and a structural connecting link for displacing said shifter body with respect to said manual transmission substantially along the longitudinal centerline of said vehicle, wherein said shifter body assembly is constructed and arranged for flexible connection to a vehicle body at a first end of said shifter assembly and wherein said connecting link is constructed and arranged for flexible connection to said manual transmission at a second end of said shifter assembly, wherein said shifter body assembly is displaced a predetermined distance with respect to said manual transmission substantially along the longitudinal centerline of said vehicle.

2. The shifter kit as set forth in claim 1 wherein said connecting link is removably and replaceably secured to said shifter body assembly, wherein said connector link has a predetermined length for providing predetermined shifter body displacement with respect to said manual transmission.

3. The shifter kit as set forth in claim 1 wherein said connecting link is removably and replaceably secured to said shifter body assembly, wherein said connector link has an adjustable length for providing adjustable shifter body displacement within a predetermined range with respect to said manual transmission.

4. The shifter kit as set forth in claim 1 wherein said connecting link includes a first end, a center portion and a second end, wherein said first end is constructed and arranged for removable securement to said shifter body assembly, wherein said second end is constructed and arranged for flexible attachment to said manual transmission, wherein said center portion establishes said shifter assembly displacement with respect to said manual transmission.

5. The shifter kit as set forth in claim 4 wherein said second end of said connector link includes a first bore extending substantially transverse with respect to said center portion, said first bore including a resilient bushing constructed and arranged to permit articulation of said shifter assembly with respect to said manual transmission.

6. The shifter kit as set forth in claim 4 wherein said first end of said connector link includes at least one aperture constructed and arranged to receive at least one fastener for attaching said connector link to said shifter body assembly.

7. The shifter kit as set forth in claim 1 wherein said shifter body assembly includes a shifter body, a shift lever and a stop plate, wherein said shifter lever is pivotally mounted and self-centering within said shifter body having a first end portion extending upwardly above said shifter body for operator manipulation of said shifter lever and a second portion extending downwardly below said shifter body for connection to a shifter linkage, wherein said stop plate is constructed and arranged to cooperate with said shift lever to limit pivotal travel of said shift lever.

8. The shifter kit as set forth in claim 7 wherein said first end portion of said shift lever is constructed and arranged to cooperate with a removable and replaceable shift handle, wherein said shift handle may include one or more offsets for ergonomic placement of a shift knob.

9. The shifter kit as set forth in claim 7 wherein said shifter lever includes an integrally formed spherical bearing positioned between said first end and said second end portions of said shift lever, said spherical bearing constructed and arranged to cooperate with said contoured cavity within said shifter body to allow pivotal operator manipulation of said shift lever.

10. The shifter kit as set forth in claim 9 wherein said spherical bearing including a transverse bore for accepting a pin member, wherein said pin member extends outwardly from both sides of said spherical bearing, wherein said outwardly extending portions of said pin member each cooperate with a spring member positioned within said contoured shifter body cavity to center said shift lever.

11. The shifter kit as set forth in claim 9 wherein said second end portion of said shift lever includes a transverse bore for connection to said shifter linkage, wherein said transverse bore includes a centerline axis, wherein said centerline axis is spaced from about 1.8 inches below the center of said spherical bearing to about 2.2 inches below the center of said spherical bearing;
    whereby said shifter provides high ratio short throw shifting of said manual transmission.

12. The shifter kit as set forth in claim 9 wherein said second end portion of said shift lever includes a transverse bore for connection to said shifter linkage, wherein said transverse bore includes a centerline axis, wherein said centerline axis is positioned about 1.9 inches below the center of said spherical bearing;
    whereby said shifter provides high ratio short throw shifting of said manual transmission.

13. The shifter kit as set forth in claim 7 wherein said stop plate is constructed and arranged to attach to an upper surface of said shifter body, wherein said stop plate includes a forward motion stop for controlling forward shift lever motion and a rearward motion stop for controlling rearward shift lever motion;
    whereby said forward motion stop and said rearward motion stop cooperate with said shifter lever to provide positive shifter lever stops during shift lever manipulations to reduce stress on transmission components.

14. The shifter kit as set forth in claim 13 wherein said forward motion stop includes a first stop member, said first stop member including a top surface and a threaded stem, wherein said threaded stem is constructed and arranged to threadably engage said stop plate at a forward portion thereof, wherein said top surface cooperates with said shift lever to control forward shift lever motion, wherein said rearward motion stop includes a second stop member, said second stop member including a top surface and a threaded stem, wherein said threaded stem is constructed and arranged to threadably engage said stop plate at a rearward portion thereof, wherein said top surface cooperates with said shift lever to control rearward shift lever motion.

15. The shifter kit as set forth in claim 1 wherein said shifter body includes at least one outwardly extending tab, wherein said at least one outwardly extending tab is constructed and arranged to include a resilient member for permitting articulation of said shifter assembly with respect to said vehicle body, wherein said resilient member includes a central bore constructed and arranged to receive a fastener for securing said first end of said shifter assembly to said vehicle body.

16. The shifter kit as set forth in claim 15 wherein said resilient member is constructed of rubber.

17. The shifter kit as set forth in claim 15 wherein said resilient member is constructed of urethane.

18. The shifter kit as set forth in claim 15 wherein said resilient member central bore is constructed and arranged to receive a tubular metal sleeve, wherein said tubular metal sleeve includes a central bore constructed and arranged to receive a bolt for securing said metal sleeve within said resilient member, wherein said tubular metal sleeve includes at least one tab rigidly secured thereto, wherein said at least one tab is constructed and arranged for attachment to said vehicle body.

19. The shifter kit as set forth in claim 1 wherein said shifter body and said connecting link are constructed of aluminum.

20. The shifter kit as set forth in claim 4 wherein said second end of said connection link includes an internal threaded bore for cooperation with a spherical bearing, wherein said spherical bearing includes an elongated threaded stem, wherein said spherical bearing is rotatable to adjust the length of said connecting link, whereby placement of said shifter body is adjustable within a predetermined range with respect to said manual transmission.

\* \* \* \* \*